May 13, 1952      C. W. ROES      2,596,959
OSCILLATING FISH LURE
Filed June 1, 1949
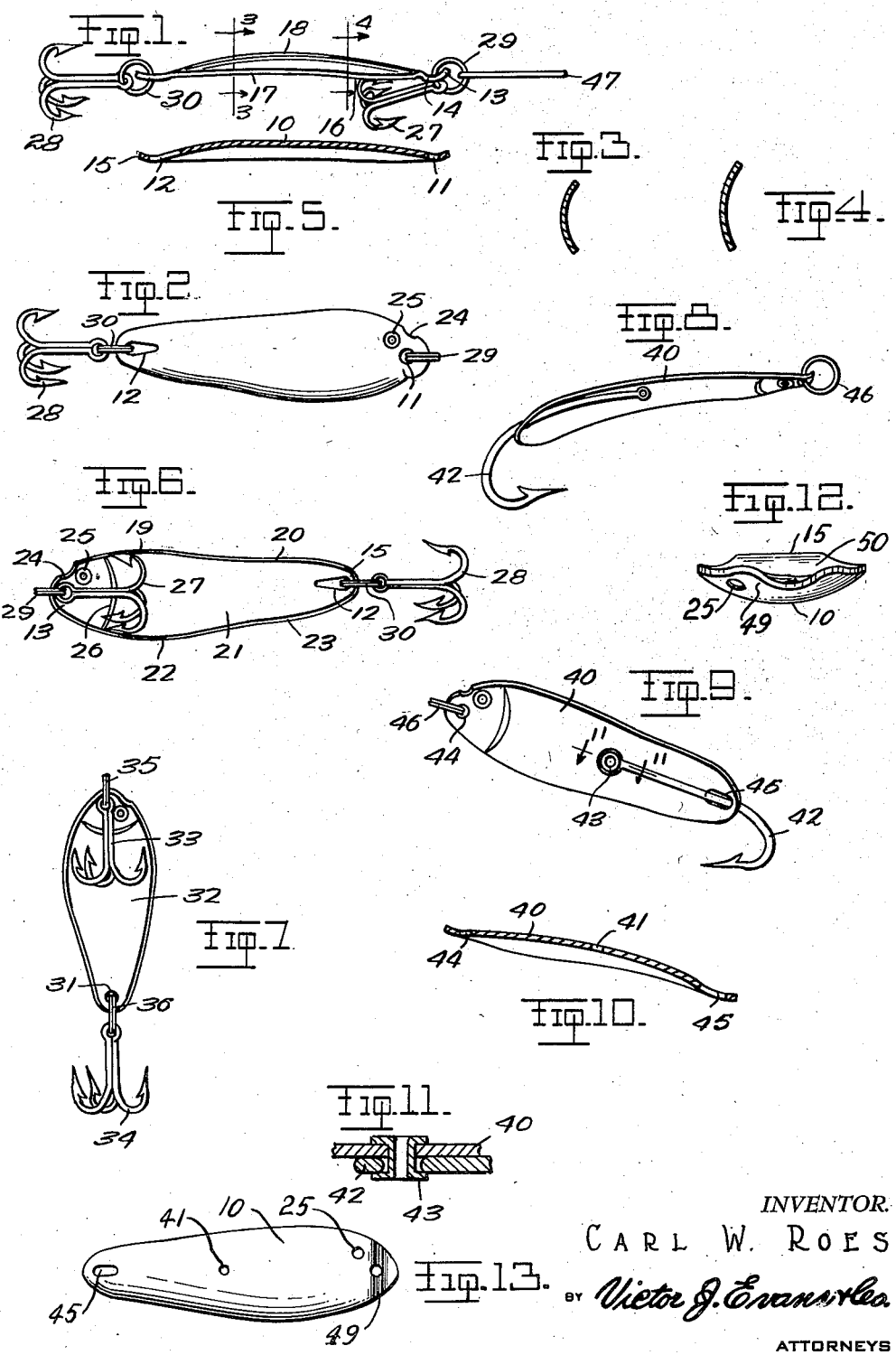
INVENTOR.
CARL W. ROES
BY Victor J. Evans & Co.
ATTORNEYS Patented May 13, 1952

2,596,959

UNITED STATES PATENT OFFICE 2,596,959

OSCILLATING FISH LURE

Carl W. Roes, Pikesville, Md.

Application June 1, 1949, Serial No. 96,522

1 Claim. (Cl. 43—42.5)

This invention relates to fish lures of the spoon type having wavy or oscillating motions as they are drawn through the water, and in particular a lure including a plate arcuate in cross section and shaped to represent a conventionalized fish with a part of the lower edge corresponding with the belly of a fish extended a greater distance from a center line through the plate than the upper portion of the fish and the plate is provided with hooks at the ends and the hooks at the forward end are attached to the lure by a ring to which the line is also attached.

The purpose of this invention is to provide an improved fish lure in which a spoon that oscillates as it is drawn through the water is designed to represent a crippled fish.

The object of this invention, is therefore, to form a spoon forming a fish lure so that the lure will have the appearance of a crippled fish as it is drawn through the water.

Another object of the invention is to provide means for forming a plate or spoon of a fish lure whereby the lure will travel in a horizontally disposed position and oscillate with a wavy motion as it is drawn through the water.

A further object of the invention is to provide an improved spoon for fish lures that travels in a zigzag horizontal path and oscillates which is of a simple and economical construction.

With these and other objects and advantages in view the invention embodies a plate designed to represent a fish with an outwardly bowed intermediate portion and having hook attaching eyes at the ends with split rings in the said eyes.

Other features and advantages of the invention will appear from the following description taken in connection with the drawings wherein:

Figure 1 is an edge view illustrating the improved fish lure.

Figure 2 is a plan view of the lure looking toward the outwardly bowed or convex surface thereof.

Figure 3 is a cross section through the plate taken on line 3—3 of Figure 1.

Figure 4 is a similar section taken on line 4—4 of Figure 1.

Figure 5 is a longitudinal sectional plan through the plate with the hook attaching elements omitted.

Figure 6 is a plan view looking toward the opposite or concave side of the lure.

Figure 7 is a view showing certain constructional details of the lure.

Figure 8 is a perspective view of the lure showing the lure inverted and illustrating a modification wherein a hook is attached to an intermediate point of the lure.

Figure 9 is a bottom view of the lure shown in Figure 8 looking toward the concave side thereof.

Figure 10 is a longitudinal section through the spoon of the lure with the hook and attaching elements omitted.

Figure 11 is a detail taken on line 11—11 of Figure 9, showing a cross section through the point where the hook of the design illustrated in Figures 8, 9, and 10 is attached to the body of the spoon.

Figure 12 is an end view looking toward the head end of the lure.

Figure 13 is a plan view showing the transverse recess.

Referring now to the drawings wherein like reference characters denote corresponding parts the improved fish lure of this invention includes a spoon body 10 having an opening 11 in the forward end and a slot 12 in the trailing end.

The plate from which the spoon 10 is formed, is provided with a head formation on the leading end and with the side edges converging toward the trailing end, the end of the spoon forming the head being provided with a tip 13, and at the rear of the tip there is a bend toward the convex side and in the edge representing the back to define a recess 49 extended transversely across the said head end and in the convex side of the spoon. On the upper side of the spoon when in use, opposite the recess 49, the spoon is provided with a raised surface 14 anterior to an indented section 50.

The trailing end of the spoon is formed with an arcuate tip 15 with the material of the spoon extended toward one side and then bent toward the other as illustrated in Figure 2. The slot 12 is positioned in the trailing end of the spoon between the tip 15 and the body 10 thereof.

In use the lure is positioned in the water as illustrated in Figure 12 with the convex surface extended downwardly and the concave surface upwardly and with the spoon in this position the combination of the tip 13 with the indented recess or part 50 provides a wavy action in the water and at the same time causes the spoon to oscillate.

As illustrated particularly in Figure 6 the upper portion of the spoon is formed with a comparatively flat edge the high point of which is at the point 19 and from this point the upper edge curves downwardly and rearwardly on the line 20 and at the trailing end the edge merges with the tip 15. The lower edge of the spoon on the opposite side of a center line is bowed downwardly to a low point 22 corresponding with the belly of a fish and from this point it slopes upwardly to the tip or nose 13 at the leading end of the spoon and the lower edge also curves upwardly on the line 23 toward the lower edge of the tip 15 on the trailing end of the spoon.

The leading end of the spoon may also be designed to represent the head of a fish with an indentation 24 adjacent the tip or nose 13, an eye 25 spaced from the said indentation and the surface is provided with gill or head marks 26 as shown in Figure 6. The eye 25 may be in the form of an opening or it may be the representation of an eye of a fish formed of aluminum or any other suitable material, or the said eye could be painted on the spoon, if desired.

Hooks 27 and 28 are attached to the ends of the spoon with split rings 29 and 30, respectively as shown. The ring 30 may be held in a tapered slot 12 as shown in Figure 2 or may be held in a round opening 31 as illustrated in a modification shown in Figure 7 in which the spoon is illustrated by the numeral 32 and the hooks by the numerals 33 and 34. The hooks of this design are attached by split rings 35 and 36 respectively.

In the design illustrated in Figures 8 to 11 a spoon 40 that is a duplicate of the spoon 10 is provided with an opening 41 intermediate of the length thereof in which a hook 42 is mounted by an eyelet 43 as illustrated in Figure 11. In this design the forward end of the spoon is provided with an opening 44 similar to the opening 11 and a tapered slot 45 corresponding to the slot 12 with the small end of the slot holding the shank of the hook to prevent lateral movement thereof. A ring 46 similar to the ring 29 is provided in the opening 44 at the forward end and the shank of the hook 42 is extended through the slot 45 in the opposite end as illustrated in Figures 8 and 9. It will be understood that a hook or hooks may be attached to or mounted on the spoon in any manner or by any means.

With the parts arranged in this manner the improved fish lure of this invention which resembles the alewife or ruptured fish stands uprightly in the water as it is used in fishing and oscillates with a lateral motion twisting about a line 47 which is attached to a ring 29 as it is drawn through the water. The device, therefore, creates the impression that it is a crippled alewife and as the alewife provides food for many types of fish this device is a very efficient fish lure.

It will be understood that other modifications may be made in the design and arrangements of the parts without departing from the spirit of the invention.

What is claimed is:

A fishing spoon comprising a plate concave on one side and convex on the other and being of greater length than width, the edges of the plate shaped to conform to the back and belly, respectively, of a fish with a head formation on the leading end and with the edges converging from a point spaced from the head toward the trailing end, the end of the spoon forming the head being provided with a bend toward the convex side and in the edge representing the back to define a recess extended transversely across the said head end and in the convex side of the spoon, the said head end having a centrally positioned opening substantially entirely within the boundaries of the recess, and an eye longitudinally spaced inwardly of the said opening and laterally spaced from the longitudinal axis of the plate, said eye spaced closely to the upper edge of the spoon forming the back and the said edge of the plate in which the eye is positioned having a corrugation therein spaced inwardly from the said recess and extended from the eye to the edge of the plate, the trailing end of said spoon curving from the convex side of the plate to the concave side and having a flat tip on the end positioned in a plane in which the edges of the head end of the spoon are positioned.

CARL W. ROES.

REFERENCES CITED

The following references are of record in the file of this patent:

UNITED STATES PATENTS

| Number | Name | Date |
|---|---|---|
| 1,209,020 | Pflueger | Dec. 19, 1916 |
| 1,763,031 | Yates | June 10, 1930 |
| 1,847,397 | Hofschneider | Mar. 1, 1932 |
| 1,963,380 | Peters et al. | June 19, 1934 |
| 2,251,593 | Mangle | Aug. 5, 1941 |